United States Patent [19]

Donahue, Jr.

[11] Patent Number: 4,651,971
[45] Date of Patent: Mar. 24, 1987

[54] DIRECT ACTING VALVE ASSEMBLY

[75] Inventor: William R. Donahue, Jr., West Lafayette, Ind.

[73] Assignee: Appliance Valves Corporation, West Lafayette, Ind.

[21] Appl. No.: 794,451

[22] Filed: Nov. 4, 1985

[51] Int. Cl.$^4$ .......................... F16K 31/06; F16K 1/42
[52] U.S. Cl. ................................ 251/129.15; 251/118; 251/361; 137/550
[58] Field of Search .................... 251/129.15, 118, 360, 251/361, 65; 137/550

[56] References Cited

U.S. PATENT DOCUMENTS

| | | | |
|---|---|---|---|
| 3,738,578 | 6/1973 | Farrell | 251/65 X |
| 3,818,398 | 6/1974 | Barbier et al. | |
| 3,872,878 | 3/1975 | Kozel et al. | |
| 4,159,026 | 6/1979 | Williamson | 251/65 X |
| 4,174,824 | 11/1979 | Kolze | |
| 4,175,590 | 11/1979 | Grandclement | |
| 4,178,573 | 12/1979 | Swanson | |
| 4,387,878 | 6/1983 | Zukausky | |

Primary Examiner—Arnold Rosenthal
Attorney, Agent, or Firm—Woodard, Weikart, Emhardt & Naughton

[57] ABSTRACT

A direct acting valve assembly including a valve body and a guide tube attached thereto. An insert is secured within the guide tube and includes a central aperture and at least one filtering aperture. The valve body includes an annular surface between an annular inlet and a centrally located outlet, and an annular seal is positioned in a central recess in the bottom of the insert and adjacent the annular surface to provide a fluid tight seal therebetween. The guide tube receives a closure member which has one end tapered to a point positionable through the central aperture of the insert and adjacent the annular seal. A spring and solenoid combination is operable to move the closure member between a first position displaced from the annular seal and opening the valve and a second position adjacent the annular seal and sealing the central passageway. A plurality of fins standing upright and rigidly attached to the insert defines a guide path for the closure member permitting accurate alignment of the tapered end of the closure member and the central opening of the annular seal.

15 Claims, 4 Drawing Figures

DIRECT ACTING VALVE ASSEMBLY

BACKGROUND OF THE INVENTION

The present invention relates to the field of direct acting valve assemblies, and in particular to a valve assembly having an improved structure providing for more reliable opening and closing of the valve port.

Direct acting valves are used in a variety of settings and may include a solenoid control to open and close the valve port. Such valves are used, for example, in the control of water flow for ice makers and similar types of low water flow rate devices.

Typical direct acting valves currently in use for these types of applications utilize a conically pointed armature which shuts off the fluid flow by dropping into a concave seating pocket made of rubber. This design requires that the armature and concave seating pocket be closely aligned during shut-off. In current designs the armature is located in a guide tube, with liberal clearance to protect against dirt, and the guide tube is located in the valve body. The concave seating pocket (rubber diaphragm) is located in the valve body. Manufacturing tolerances accumulate to the point that the armature tip will "drag" on the side of the concave seating pocket. This drag causes two failure modes. First, failure occurs as a result of severe misalignment by the armature tip not dropping into the sealing pocket. Second, failure occurs over time when the armature tip will wear a groove in the rubber sealing pocket and a slow leak will develop.

In U.S. Pat. No. 3,818,398, issued to Barbier et al. on June 18, 1974, there is disclosed an electromagnet coil assembly used in a valve assembly. The Barbier et al. patent discloses a structure for a vlave assembly which includes a pointed plunger which is received by an aperture in a disc. The disc is in turn carried by a valve member, and in its lowermost position closes the valve port.

In U.S. patent application Ser. No. 722,170 filed on Apr. 11, 1985, issued as U.S. Pat. No. 4,558,844 to the present applicant, Donahue, on Dec. 17, 1985, there is disclosed a direct acting valve including an upraised sealing seat and a closure member having at one end a pocket containing a valve seal. In the closure position, the end of the closure member having the pocket, and thus the valve seal, is positioned down against the upraised sealing seat.

A variety of pilot operated valve assemblies are disclosed in U.S. Pat. Nos. 4,387,878, issued to Zukausky on June 14, 1983; 4,174,824, issued to Kolze on Nov. 20, 1979; 4,178,573, issued to Swanson on Dec. 11, 1979; 4,175,590, issued to Grandclement on Nov. 27, 1979; and, 3,872,878, issued to Kozel et al. on Mar. 25, 1975. These valves utilize a flexible diaphragm carrying an insert which defines a raised surface acting as a valve closure. The solenoid plunger supports a resilient member, such as rubber, positioned to close the raised surface of the diaphragm insert when the plunger is in its lowermost position. Upon closing the raised valve port, the diaphragm and insert move downwardly against the major valve port, to shut off flow of fluid through the valve. The ratio of solenoid plunger diameter to the diameter of the raised surface of the diaphragm insert is such that close alignment of these diameters is not significant in the pilot operated valves.

SUMMARY OF THE INVENTION

Briefly describing one aspect of the present invention there is provided a direct acting valve assembly which includes a guide tube mounted to a valve body, the valve body including an annular surface portion positioned between an annular inlet and a centrally located outlet, an annular seal positioned against the annular surface of the valve body, an insert secured to one of the valve body and the guide tube and including an annular surface positioned adjacent the annular seal, the insert including a central aperture, a closure member received within the guide tube having one end tapered and located in alignment with the central opening and positionable upon movement of the closure member to seal through the central aperture of the insert with the annular seal. In a further aspect, there is included means for guiding the closure member including a plurality of fins located radially about the central aperture and secured to one of the insert, the guide tube and the valve body, and means for moving the closure member between open and closed positions relative the insert.

It is an object of the present invention to provide a direct acting valve which is relatively simple and inexpensive to manufacture, and which is reliable in operation.

It is another object of the present invention to provide a direct acting valve assembly which includes a valve closure construction which avoids disadvantages of certain prior art devices due to misalignment of parts or particularly due to tolerance limitations of such earlier designs.

A further object of the present invention is to provide an improved direct acting valve assembly which can utilize the valve bodies of similar, existing art by merely exchanging inserts, seals and closure members.

A further object of the present invention is to provide a direct acting valve assembly which permits the manufacture of its component parts without high tolerances associated with prior art designs, which also carry a higher expense as to manufacturing technique.

A further object of the present invention is to provide a direct acting valve assembly which does not need the conical depression in the valve seal necessary on existing low flow rate, needle tipped armature design, direct acting valves.

Further objects and advantages of the present invention will be apparent from the description of the preferred embodiment which follows.

DESCRIPTION OF THE PREFERRED EMBODIMENT

Figure 1:
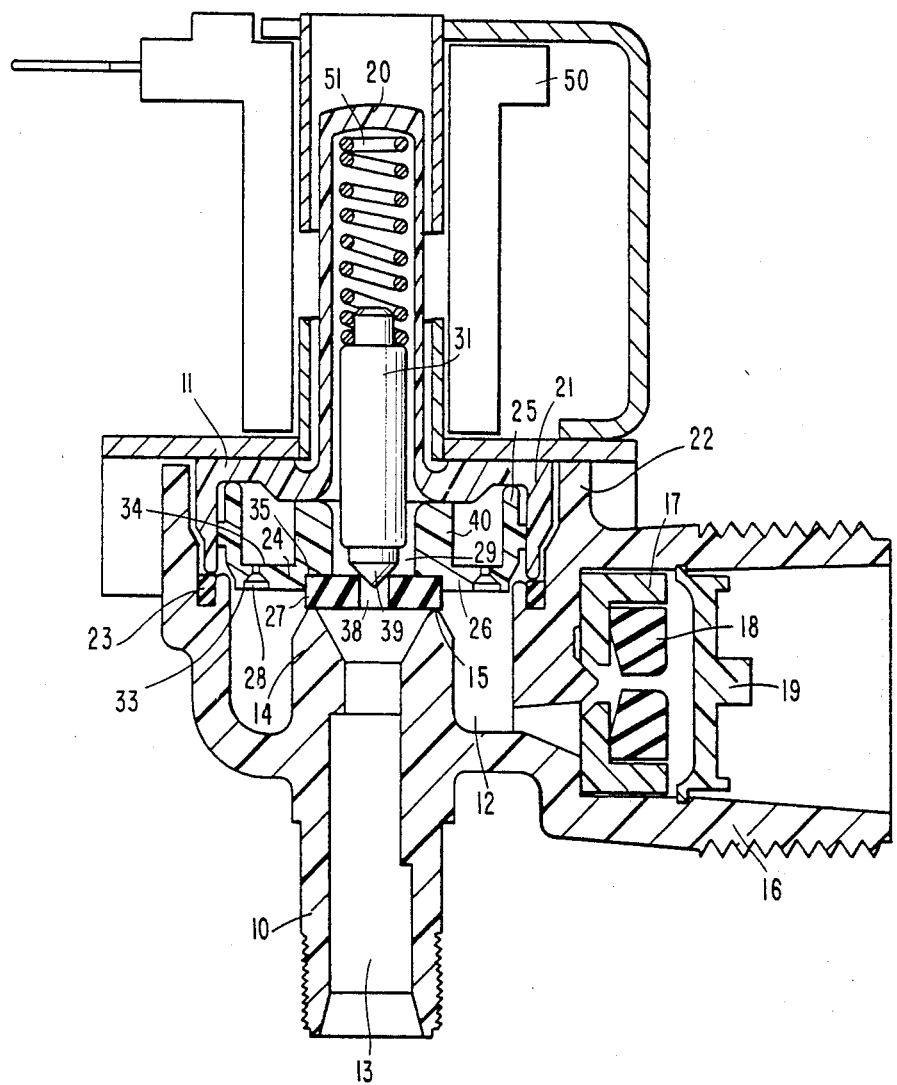
FIG. 1 is a side, cross-sectional view of a direct acting valve assembly constructed in accordance with the present invention.
Figure 3:
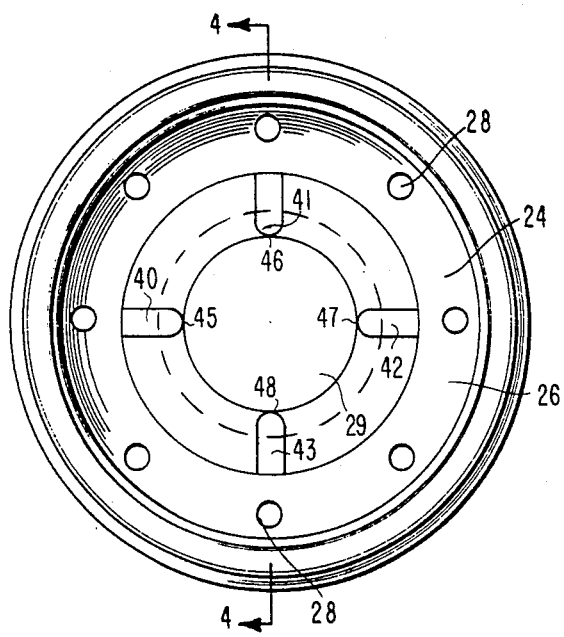
FIG. 3 is a top, plan view of the valve insert of FIG. 2.
Figure 4:
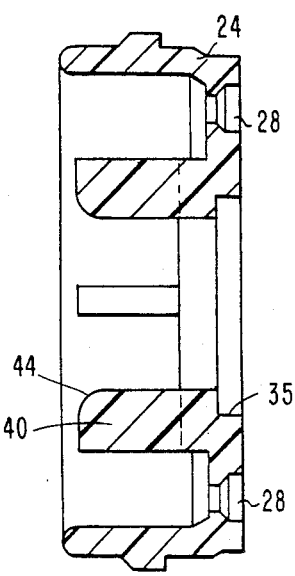
FIG. 4 is a side, cross-sectional view of the valve insert of FIG. 2.
Figure 2:
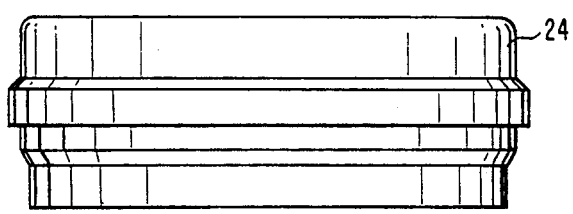
FIG. 2 is a side, elevational view of a valve insert useful in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a needle tipped armature, direct acting valve assembly which is superior in reliability and function over prior art designs. A problem with current designs is that close tolerances are necessary or misalignment may result in failure of the valve either immediately or over time. The necessity of such close tolerances results in higher manufacturing costs when employed in current designs. The present invention overcomes these problems and provides a valve which is reliable in operation without requiring unduly high tolerances on the parts and the high costs associated therewith.

Referring in particular to the drawings there is shown a valve assembly constructed in accordance with the present invention. The assembly includes a valve body 10 and a guide tube 11. The valve body includes an annular inlet 12 and a central outlet 13 relative thereto. An annular portion 14 has an annular surface 15 located between the inlet and the outlet and provides a sealing surface as further described hereafter. A coupling portion 16 provides an inlet port in communication with the annular inlet. Mounted within the coupling portion is a finned insert 17, a flow control 18 and a retainer 19. An inlet screen (not shown) is typically installed upstream of the retainer 19 within the coupling portion.

The guide tube 11 is secured to the valve body 10 and includes a cylindrical guide portion or guide cylinder 20 aligned with the outlet of the valve body. In the preferred embodiment as shown, the guide tube includes a cup-shaped portion 21 facing in the direction of the valve body and the valve body includes a complementarily shaped and facing cup-shaped portion 22. The outer surface of the cup-shaped portion of the guide tube is received adjacent the inner surface of the cup-shaped portion of the valve body. An annular seal 23 is provided to seal the connection of the guide tube with the valve body.

An insert 24 is received within the valve assembly and is secured with either of the valve body or the guide tube. It is preferred that the insert is secured to the guide tube since this permits a more reliable alignment with the guide cylinder 20, which is important to alignment of particular components associated with these two members. As shown, the insert preferably includes a cup-shaped portion 25 facing in the direction of the guide tube and the outer surface of the cup-shaped portion 25 is received adjacent and aligns the insert with the inner surface of the cup-shaped portion 21 of the guide tube.

The insert includes a first side 33 and a second side 34. The first side 33 of the insert includes a central recess 35 within which is positioned contiguously an annular seal 27 which in turn is positioned adjacent the annular surface 15 of the valve body. The components of the guide tube, insert and valve body are sized and positioned such that securement of the guide tube with the valve body forces the insert against the seal 27 to provide a fluid tight seal between the seal 27 and the annular surface 15.

The seal 27 includes a central opening 38 aligned and in communication with both the second side 34 of the insert 24 and the outlet 13 of the valve body.

The insert includes a disc-shaped portion 26 which includes several filtering inlet apertures 28 to permit flow of fluid from the annular inlet 12 to the second side 34 of the insert 24. The annular seal 27 is of a lesser diameter than the disc-shaped portion 26 of the insert. The inlet apertures 28 are then provided in a spaced relation in the area of the disc-shaped portion of the insert radially outward of the annular seal 27.

The insert includes a central aperture 29 which is aligned with and communicates with the central opening 38 of the seal 27 and the outlet 13 of the valve body. The inlet apertures 28 are preferably smaller in diameter than the diameter of the central opening 38 of the seal 27 in order to provide the desired filtering effect.

A closure member 31 is received within the guide cylinder 20 of the guide tube. The closure member includes one end 39 which is tapered approximately to a point, and which faces the seal 27. The closure member has a first position with the tapered end 39 displaced from the valve seal 27, permitting fluid to flow from the annular inlet 12 through the inlet apertures 28, then through the central aperture 29 of the insert, and then through the central opening 38 of the seal and to and through the outlet 13 of the valve body. The diameter of the central aperture 29 of the insert is smaller than the diameter of the seal 27 and larger than the diameter of the closure member 31. The closure member also has a second position in which the tapered end 39 is positioned in sealing relationship against the valve seal, and flow of fluid through the valve is precluded. The periphery of the tapered end 39 is shaped complementarily with the central opening 38 of the seal so that when the closure member is in the second position, a fluid tight seal may be achieved.

The assembly also includes a means for guiding the closure member 31 in a path coaxial with that defined by the guide cylinder 20 of the guide tube 11. In the present embodiment, the guiding means includes four fins 40, 41, 42, and 43 standing upright and radially spaced about the central aperture 29 of the insert 24. The upper corner 44 of each fin which is closest to and which would be first to contact the closure member 31 as it moves from its first position to its second position, as described above, is rounded. The height of the fins is such that they each extend from the insert 24 to just short of touching the guide tube 11 when the assembly is fully assembled. The radial placement of the fins is such that the inner edges 45, 46, 47 and 48 of the fins 40, 41, 42 and 43 define a cylinder axially aligned with both the guide cylinder 20 of the guide tube 11 and the central opening 38 of the valve seal 27 and having a diameter just slightly larger than the diameter of the closure member 31. Although the fins may be rigidly secured to either of the guide tube 11 or the valve body 10, it is preferable that they be rigidly secured to the insert since this will permit a more reliable alignment between the path of the closure member and the central opening of the seal.

The assembly also includes means for moving the closure member between the first and second positions. This means may assume a variety of conventional types, and typically includes a solenoid valve action. As shown, a solenoid coil 50 is located about the closure member and is operable to move the closure member in the direction of the first position of the closure member. A spring 51 is positioned within the guide cylinder between the top of the guide cylinder and the closure member and biases the closure member into the second position closing the valve. In operation, the valve has a normally closed condition, but upon energization of the solenoid the closure member is moved into the first, open position against the biasing force of the spring.

The materials for the valve assembly shown may be any of a variety of conventional materials. The configuration of the valve design permits the use of relatively loose tolerances because of the increased reliability of the closure member-to-valve seal alignment created by the fins.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A direct acting valve assembly which comprises:
   a valve body having an annular inlet and an outlet centrally located relative to the inlet, said body including an annular surface between the outlet and the inlet and defining a sealing seat for said valve body;
   a guide tube secured to said valve body, said guide tube defining a guide cylinder aligned coaxially with the annular inlet and with the annular surface of said valve body;
   an annular seal having first and second sides and a periphery, the first side positioned adjacent the sealing seat of said valve body and providing a fluid tight seal between said annular seal and the sealing seat of said valve body, said seal including a central opening aligned and communicating with the outlet of said valve body, the central opening of said seal defining an inner periphery;
   a closure member received and reciprocal within the guide cylinder of said guide tube, said closure member having first and second ends, the first end defining a sealing surface for engaging said annular seal, the first end of said closure member facing said annular seal;
   a rigid insert rigidly secured to said valve body and said guide tube to be immovable relative to said valve body and said guide tube, said insert having first and second sides and a periphery, said insert including an annular surface on the first side positioned adjacent said annular seal, said insert including a central aperture aligned and communicating with the central opening of said annular seal and with the outlet of said valve body, said insert also defining at least one inlet aperture extending through said insert from the first side located in communication with the inlet of said valve body to the second side in a location communicable with the central opening of said annular seal;
   means for guiding said closure member in a path coaxial with the guide cylinder;
   said closure member having a first position with the sealing surface end displaced from the second side of said annular seal allowing fluid to flow from the inlet of said valve body, through the inlet aperture of said insert and thereafter through the central aperture of said insert and thereafter through the central opening of said annular seal to the outlet of said valve body, said closure member having a second position with the sealing surface end positioned adjacent to and sealing with said annular seal preventing flow of fluid through the central opening of said seal; and
   means for moving said closure member between the first and second positions to open and close the valve assembly.

2. The assembly of claim 1 in which said guiding means comprises a plurality of guiding elements, said guiding elements defining a path coaxial with and a linear extension of the path defined by the guide cylinder of said guide tube.

3. The assembly of claim 2 in which said guiding means is rigidly secured to the second side of said insert.

4. The assembly of claim 2 in which the guiding elements comprise fins positioned radially about the central opening of said insert.

5. The assembly of claim 4 in which said guiding elements are rigidly secured to said insert.

6. The assembly of claim 1 in which said moving means includes a spring extending between said guide tube and said closure member and biasing said closure member to the second position, and further includes a solenoid device operable to move said closure member to the first position in opposition to the biasing force of the spring.

7. The assembly of claim 6 in which said guide tube includes an annular, cup-shaped portion facing in the direction of said valve body, and in which said insert includes an annular, cup-shaped portion facing in the direction of said guide tube, the cup-shaped portion of said insert having an outer surface received adjacent the inner surface of the cup-shaped portion of said guide tube and positioning said insert relative said guide tube.

8. The assembly of claim 7 in which said valve body includes a cup-shaped portion facing in the direction of said guide tube, the cup-shaped portion of said guide tube having an outer surface received adjacent the inner surface of the cup-shaped portion of said valve body.

9. The assembly of claim 1 in which said insert defines a central recess for receiving contiguously said annular seal.

10. The assembly of claim 9 in which the central recess of said insert has a diameter approximately equal to the diameter of said annular seal.

11. The assembly of claim 10 in which said insert includes a generally disc-shaped portion with the central aperture and annular seal being positioned coaxially therewith, the disc-shaped portion having an inner diameter and an outer diameter.

12. The assembly of claim 11 in which said insert includes a plurality of inlet passageways extending through the disc-shaped portion of said insert, said annular seal having a diameter less than the inner diameter of the disc-shaped portion of said insert, the inlet passageways being located in the area of the disc-shaped portion radially outward of said annular seal.

13. The assembly of claim 1 in which the first end of said closure member defining a sealing surface is tapered, the tapered end further defining a perimetrical surface.

14. The assembly of claim 13 in which the second position of said closure member includes contiguous contact between the perimetrical surface of the tapered end of said closure member and the periphery of the central opening of said annular seal preventing flow of fluid through the central opening of said seal.

15. The assembly of claim 10 and which further includes an annular seal positioned between said guide tube and said valve body.

* * * * *